US010423649B2

(12) United States Patent
Ko et al.

(10) Patent No.: US 10,423,649 B2
(45) Date of Patent: Sep. 24, 2019

(54) NATURAL QUESTION GENERATION FROM QUERY DATA USING NATURAL LANGUAGE PROCESSING SYSTEM

(71) Applicant: INTERNATIONAL BUSINESS MACHINES CORPORATION, Armonk, NY (US)

(72) Inventors: William S. Ko, Daly City, CA (US); Malous M. Kossarian, San Mateo, CA (US); Douglas A. Smith, Sunnyvale, CA (US); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 15/480,780

(22) Filed: Apr. 6, 2017

(65) Prior Publication Data

US 2018/0293302 A1   Oct. 11, 2018

(51) Int. Cl.
*G06F 17/30* (2006.01)
*G06F 16/33* (2019.01)
(Continued)

(52) U.S. Cl.
CPC ...... *G06F 16/3344* (2019.01); *G06F 16/3329* (2019.01); *G06F 16/35* (2019.01);
(Continued)

(58) Field of Classification Search
CPC ......... G06F 17/30684; G06F 17/30887; G06F 17/30654; G06F 17/30705; G06F 17/2785;
(Continued)

(56) References Cited

U.S. PATENT DOCUMENTS 9,031,845 B2   5/2015 Kennewick et al.
2007/0033005 A1   2/2007 Cristo et al.
(Continued)

FOREIGN PATENT DOCUMENTS

WO   2013/056343 A1   4/2013
WO   2015/179326 A1   11/2015

OTHER PUBLICATIONS

Jurafsky et al., "Semantic Role Labeling," Speech and Language Processing, Chapter 22, Jun. 26, 2015, 21 p.
(Continued)

*Primary Examiner* — Greta L Robinson
(74) *Attorney, Agent, or Firm* — Conley Rose, P.C.

(57) ABSTRACT

A training query generation system is usable to generate fully formed training questions from prior search queries, some of which may be fully formed search queries and some of which are not fully formed. The system may identify fully formed questions from a query database stored on a storage device. The query database includes a plurality of search query character string, The system further identifies partially formed questions from the query database, creates question templates from the identified fully formed questions, and stores the question templates in a template database. The system then identifies entities with the partially formed questions, classifies each entity, and stores the classified entities in an entity database. Fully formed questions can then be generated using the question templates from the template database and classified entities from the entity database.

20 Claims, 5 Drawing Sheets

(51) Int. Cl.
*G06F 17/27* (2006.01)
*G06F 16/35* (2019.01)
*G06F 16/951* (2019.01)
*G06F 16/332* (2019.01)
*G06F 16/955* (2019.01)

(52) U.S. Cl.
CPC ........ *G06F 16/951* (2019.01); *G06F 16/9566* (2019.01); *G06F 17/278* (2013.01); *G06F 17/2785* (2013.01)

(58) Field of Classification Search
CPC ............. G06F 17/30864; G06F 17/278; G06F 16/3344; G06F 16/9566; G06F 16/3329; G06F 16/951; G06F 16/35
See application file for complete search history.

(56) References Cited

U.S. PATENT DOCUMENTS

| | | | |
|---|---|---|---|
| 2012/0150835 A1* | 6/2012 | Bobick | G06F 17/2795 707/706 |
| 2014/0108013 A1 | 4/2014 | Di Cristo et al. | |
| 2016/0063879 A1* | 3/2016 | Vanderwende | G09B 7/00 434/322 |
| 2018/0075366 A1* | 3/2018 | Dole | G06F 17/30684 |
| 2018/0246878 A1* | 8/2018 | Bailey | G06F 17/2775 |

OTHER PUBLICATIONS

Wikipedia, "Named-entity recognition," Aug. 2, 2016, 6 p. [Online] https://en.wikipedia.org/wiki/Named-entity_recognition.
Wikipedia, "Semantic role labeling," Nov. 14, 2015, 2 p. [Online] https://en.wikipedia.org/wiki/Semantic_role_labeling.
Dannenhauer et al., "Case-Based Goal Selection Inspired by IBM's Watson," 2013, 15 p.
Anonymously, "System for Generating A Set Of Questions From A Natural Language Document," Apr. 4, 2014, 3 p.
Anonymously, Question Chaining: Method For Asking Follow-Up Questions To A Previous Question In A Similar Context To Refine A Set Of Answers From The Same Answer Bucket In A Natural Language Question Answer (NLQA) System, Jun. 18, 2014, 3 p.
Anonymously, "Method For Dynamic Construction Of Natural Language Seed Question Or Summary Based On Profile Context," Jun. 24, 2014, 5 p.

* cited by examiner

NATURAL QUESTION GENERATION FROM QUERY DATA USING NATURAL LANGUAGE PROCESSING SYSTEM

BACKGROUND

The present disclosure relates to the automated creation of training questions for training language processing systems, and more specifically, to the generation of training questions from a database of previous search queries.

The training of computer-implemented question-answering systems benefit from the availability of large repositories of training questions. Generating training datasets is cumbersome and time consuming.

SUMMARY

According to an embodiment, a computer-implemented method includes identifying fully formed questions from a query database stored on a storage device, the query database containing a plurality of search query character strings and identifying partially formed questions from the query database. The method further includes creating question templates from the identified fully formed questions, storing the question templates in a template database, identifying entities with the partially formed questions and classifying each entity, storing the classified entities in an entity database, and generating fully formed questions using the question templates from the template database and classified entities from the entity database.

In another embodiment, a system includes one or more computing devices configured to execute a query service and a natural language service and one or more storage devices configured to store a query database, a template database and an entity database. The query service is configured to receive a search query character string, generate a topic identifier associated with the search query character string, and add a record to the query database including the search query character string, the topic identifier, and a time stamp. The natural language service is configured to retrieve a plurality of records from the query database and, for each record, determine whether the search query character string is a fully formed question or a partially formed question. The natural language service also is configured to, for a fully formed question, replace a portion of the fully formed question with an argument value indicative of a role associated with the replaced portion of the fully formed question to generate a query template and store the query template in the template database, and for a partially formed question, identify an entity, classify each identified entity, and store the entity and a classification for the entity in the entity database.

Another embodiment is directed to a computer program product for computer generation of training questions for training a language processing system. The computer program product comprises a computer readable storage medium having program instructions embodied therewith. The program instructions are executable by a processing resources to cause the processing resource to, from a plurality of search query character strings stored in a storage device, identify fully formed questions and identify partially formed questions and create question templates from the identified fully formed questions and store the question templates in a template database. The program instructions also cause the processing resource to identify entities within the partially formed questions, classify each entity, store the classified entities in an entity database, and generate fully formed questions through insertion of entities from the entity database into the question templates from the template database.

DETAILED DESCRIPTION

The embodiments described herein are directed to the automated generation of training questions for use in training a language processing system such as a question and answering system. The disclosed system includes or has access to a database of previously submitted queries. The queries were submitted to, for example, search engines and thus largely represent search queries of interest to those that submitted the queries. Some of the search queries may be fully formed questions, while other queries are partially formed questions. Fully formed questions are of greater use as training questions to a question and answer system than partially formed queries. The disclosed system identifies the fully formed questions within the query database and generates question templates from the fully formed questions. A question template may be generated by replacing one or more portions of a fully formed query with an argument value that identifies the type of word or phrase that was replaced (e.g., person, place, thing, etc.). The partially formed queries are used to detect entities within the partially formed queries and classify each such entity (e.g., person, place, thing, etc.). The entities and their corresponding classifications may be stored in an entity database.

Upon receipt of a request for a large training data set, the system accesses the question templates, and generates multiple fully formed training questions from each template by replacing the argument value in the template with each of multiple entities from the entity database of the corresponding classification. Each replacement with an entity results in the creation of a fully formed training question. In some embodiments, a user may desire a dataset of training questions relevant to a particular topic of interest (e.g., sports, banking, etc.). Each query in the query database may be mapped to a topic identifier, and in some examples only the queries with the topic identifiers that match the topic of interest to the user are used to create the fully formed training questions.

Figure 1:
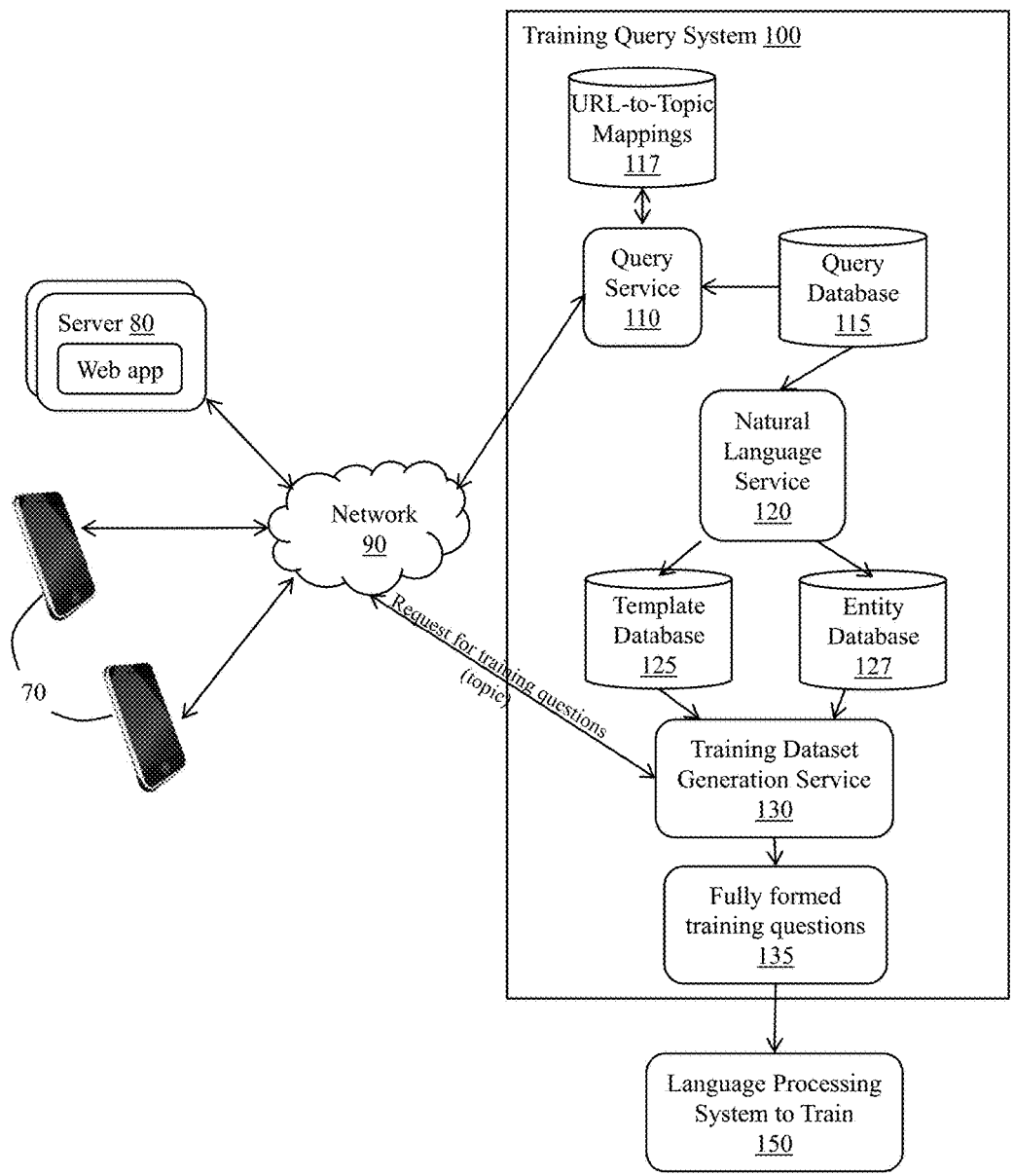
FIG. 1 shows a system in accordance with various embodiments.

With reference now to FIG. 1, an embodiment of a training query system 100 is shown coupled to one or more user devices 70 and servers 80 by way of a network 90. Network 90 may be one or more of a public network (e.g., the Internet), local area networks (LANs), wide area networks (WANs), wired or wireless networks, etc. The user devices 70 may comprise personal computers (e.g., desktop computers, notebook computers, etc.), smart phones, tablet devices, personal digital assistants (PDAs), or any other type of computing device that permits a user to interact with the device. The user devices 70 may include one or more hardware processors, memory, non-volatile storage (hard disk drive, solid state storage drive, etc.), network interfaces, etc. and may include an operating system and a network interface application such as a web browser. Through the web browser, the user can access one or more search engines and submit search queries of a topic of interest to the user.

Each of the servers 80 includes computer hardware such as processors, memory, network interfaces, etc. and executes one or more web applications. An example of such a web application may be a search engine or an application that generates an informational website (e.g., a sports website, a banking website, a news website), an interactive website, or any of numerous other types of websites. Upon submission of a search query, a search engine generates one or more search results and presents the search results to the user device's browser. The user can then select one of the search results and view the web page corresponding to the selected search result.

The training query service 100 includes a query service 110, a query database 115, a uniform resource locator (URL)-to-topic mappings database 117, a natural language service 120, a template database 125, an entity database 127, and a training dataset generation service 130. The training dataset generation service 130 generates a set of fully formed training questions 135 which can be provided to a language processing system to train 150 for training purposes, or to a user which himself can submit the fully formed training questions 135 to train the language processing system to train 150. The query service 110, natural language service 120, and training dataset generation service 130 may comprise program instructions embodied on a computer readable storage medium which are executable by a processing resource to perform the functions described herein. The processing resource may include one or more processors, one or more computers (e.g., servers), or any other type of computing device(s). Each of the query service 110, natural language service 120, and training dataset generation service 130 may be implemented as a separate program instructions (e.g., separate software executables), or two or all three of the services may be comprise a single executable.

The query service 110 obtains a copy of the search queries and stores the search queries in the query database 115. The query service may log the query it receives during a mode of operation in which users submit queries. The query service also may log the search results selected by the user. Each search query may comprise a search query character string such as an alphanumeric character string including letters, numbers, punctuation (e.g., question marks), and other symbols (e.g., asterisks, dollar signs, etc.). The search query character string may be of an arbitrary length. The query service 110 also may store a timestamp with each query. The timestamp may be generated by the web browser of the user device 70 from which the search query was generated, or the query search 110 upon receipt of the search query. The timestamp is stored in the query database 115 with the search query.

The URL-to-topic mappings database 117 includes mappings between URLs of specific websites and topic identifiers associated with those websites. In one embodiment, the mappings contained in the URL-to-topic mappings database 117 are generated and added to the database on an on-going basis as websites are created and crawled by a crawling service (not shown). The crawling service analyzes a given web page based on one or more factors such as textual content within the web page and metadata associated with the web page. The crawling service matches a given web page to one of multiple topics, and assigns a topic identifier based on the determined topic (each topic has a unique topic identifier). Existing topic classifiers can be used in this regard. The topics may include one or more (e.g., dozens, hundreds, thousands) of different topics (e.g., sports, news, politics, etc.). The crawling service stores mappings between the URLS and the topic identifiers in the database 117.

There are existing topic classifiers that can be used. One point needs to be made clear is that the topics is an optional feature of the invention. In other word, the invention still works without topics, but if there exist topics, the invention can be used to create more focused results.

As noted above, users submit queries which the query service 110 stores in the query database 115 along with a timestamp. The timestamp may include a date, a date and time, or another designation of time. Additionally, users may access websites listed in the query results following submission of search queries in their browsers. For example, a user may submit "How many medals did Brazil win during the 2016 summer Olympics?" Following the submission of that search query into a search engine on the user's browser, references to multiple websites are generated and presented to the user in the browser. Each reference includes a hyperlink to a website which the search engine has determined to be relevant to the user's specific query. The user then may select (e.g., click on) one of the displayed query results and the user's browser is then redirected to the web page associated with that selected result. The URL associated with the selected web page is likely relevant to the search query. When the query service 110 stores a search query character string in the query database 115 associated with the submitted search query, the query service 110 also may retrieve the topic identifier from the URL-to-topic mappings database 117 associated with the URL that the user selected from the search results. Upon receipt of a new search query, the query service 110 thus may add an entry to the query database 115 containing the search query character string, a timestamp, and a topic identifier. The query database 115 thus may contain a plurality of records, each record corresponding to a search query and tagged with a timestamp and a topic identifier that indicates the topic associated with that particular search query. As is explained above, the topic identifiers can be used by the training dataset generation service 130 to generate a set of fully formed training questions 135 associated with a given topic of interest specified by a user that may need questions to train a language processing system related to a particular topic.

Referring still to FIG. 1, the natural language service 120 accesses the records of the query database 115. The natural language service 120 determines those search query character strings in the query database that are fully formed sentence (e.g., complete sentences having a subject and a verb) and determines those search query character strings that are not fully formed sentences. From the search queries that are fully formed sentences, the natural language service 120 creates question templates, which are modified versions of the fully formed sentence queries. The modifications may include the replacement of one or more portions of the fully formed sentence query with an argument value that encodes the type of portion the argument value replaces. For example, if the portion of the sentence being replaced is the name of a country, the argument value may be a value that encodes "country" to indicate that a name of country should occupy that place within the template to generate a new search query. In addition, the type may contain the semantic role of the argument as identified by the natural language service. The natural language service 120 address records to the template database. Each such record may include the question template, a timestamp associated with the query from which the template was derived as well as the query's topic from the query database.

From the search queries determined not to be fully formed sentences (e.g., all search queries not otherwise determined to be fully formed sentences), the natural language service 120 identifies semantic arguments within such queries (e.g., agents of the query), classifies each such arguments, and adds records to the entity database that include the entities and their respective classifications. For example, for a partial query such as "Rio de Janeiro Olympics", the part "Rio de Janeiro" would be recognized as a place in which people are likely interested and saved as an entity in the entity database 127, along with the classification "place" to indicate that that entity is a place (as opposed to a person or a thing). In some embodiments, the natural language service 120 includes, or has access to, a semantic role labeler and assigns a value to a semantic argument within the partial search query based on a semantic role from the semantic role labeler. By way of an example, given the sentence "John broke the window", the natural language service may identify "John" as the agent (doer) of the action "broke" and "the window" as the "theme" (the thing broken). In some cases, the natural language service may identify enhanced roles. For example, given a sentence "The price increased from $1 to $2 yesterday", the service may also label "start-amount," "end-amount," "temporal" arguments, etc.

As noted above, the natural language service 120 identifies fully formed sentences from search query character strings from the query database. Any one or more of multiple techniques can be employed to determine whether a search query character string is a fully formed sentence. In one example, the presence of a question mark at the end of a search query character string may indicate that the search query character string is a fully formed sentence. A question mark can be detected by, for example, its American Standard Code for Information Interchange (ASCII) code. The ASCII code for the question mark is 3 Fh (63 decimal). Of course, just because a search query character string ends with a question mark does not always mean that rest of the search query character string is a complete sentence, but often such is the case (that the rest of query is a complete sentence).

In another example, a fully formed sentence may be detected by parsing each search query character string from the query database, and optionally assigning a semantic role to each portion of the character string, and determining whether the sentence is in interrogative mood based on clues such as whether an auxiliary verb (e.g., does, did, have, etc.) that precedes the subject of the sentence. For example, the search query character string "Did Jim run for office?", the auxiliary verb "did" precedes the subject "Jim."

In yet another example of determining whether a search query character string is a fully formed sentence, the natural language service 120 determines whether the character string begins with an interrogative word such as "when", "where", "why", "how", and what" as can be detected through a detection of string corresponding to these particular combinations of characters.

In some embodiments, one or more, but not all, of these techniques are employed to identify those search query character string that represent fully formed sentences. In some embodiments, two or more techniques (such as those described above) are employed to identify fully formed sentences. In embodiments in which multiple techniques are employed, a search query character string may be determined to be a fully formed sentence if multiple techniques indicate that the character string is likely a fully formed sentence. In other embodiments, a search query string may be determined to be a fully formed sentence based on various clues that range from strong down to weak and a combination of such clues may deem a query to be a fully formed sentence.

Once a search query character string is identified as being a fully formed sentence, the natural language service 120 generates a question template from the search query character string. In one embodiment, a question template can be created using semantic role labeling. For example, a parser and a semantic role labeler may be applied to the fully formed question. The search query may be modified by replacement of at least one portion of the fully formed question with an argument value that is indicative of a role associated with the replaced portion. The replaced portion may be the agent of the head of the sentence and may be indicative of a person, place, thing, etc. The argument value encodes or is otherwise indicative of the role of the replaced portion. In some embodiments, the parser may parse a sentence into a syntactic tree, identifying predicate, subject, object, etc. The semantic role labeler may label various arguments (portion of the tree) with semantic roles, such as agent (doer), recipient, temporal, locational, etc. The semantic role labelers may work on the results of syntactic parser. The entity identifier may identify a portion of text as referring to a type of entity, such as people, company, place, address, etc. The entity identifiers may operate on original text and may not depend on syntactic parse and semantic roles. The types assigned to the replaced portions of the generated templates may indicate both the entity type and the semantic role (if available).

Referring still to FIG. 1, once the template database 125 is populated with question templates, and corresponding timestamps and topic identifiers and the entity database 127 is populated with entity names and corresponding classifications, the training dataset generation service 130 can generate fully formed training questions 135. In some embodiments, a user may submit a request from a user device 70 to the training dataset generation service 130. The request may be a request for a training dataset. The request may include an identifier of a particular topic to which the training questions should pertain. In some embodiments, the topic identifiers may correspond to the topics listed in the URL-to-topic mappings database 117. A user that submits the request may access the training dataset generation service 130. The training dataset generation service 130 may generate a console user interface (a "console") to be displayed by a browser executing on the user's user device 70 through which the user can interact to select a topic from a list of displayed topics (e.g., from a drop-down menu, a list of topics with corresponding radio buttons, etc.). In other embodiments, the user can submit a request to an application programming interface (API) to request a set of training questions to be generated, and the API request may include a topic identifier as an input parameter.

In response to the request for training questions, the training dataset generation service 130 generates fully formed questions using the question templates from the template database 125 and the classified entities from the entity database 127. One or more of the question templates in the template database 125 are tagged with a topic indicator as explained above. The training dataset generation service 130 selects those question templates from the template database that have topic identifiers that match the topic identifier submitted by the user in the request. Those particular question templates are selected, and not the rest of the question templates from database 125, to form the training questions.

The training dataset generation service 130 also selects agents from the entity database 127 whose classifications match (or otherwise correspond to) the argument values of the selected question templates. Each question template may be used to generate one or more training questions. Each training question generated from a particular question template may be generated by replacing the argument value from the question template with an entity from the entity database 127 that has a classification that corresponds to the argument value. For example, if the question template's argument value encodes "place", then entities from the entity database whose classifications are "place" are substituted into the question template in the place of the argument value. For example, if the argument value in a particular question template corresponds to "place", and the entity database has 10 entities classified as places, then the question template is used by the training dataset generation service to generate 10 training questions, each with one of the 10 place-classified entities from the entity database.

The computer-generated fully formed training questions 135 may be transmitted by the training query system 100 directly to the language processing system to train 150. The request for training questions from the user may include a reference (e.g., a URL) to the language processing system to train 150, or the user may separately specify the reference to the language processing system to train 150 to the training query system. In yet other embodiments, the training dataset generation service 130 may transmit the fully formed training questions 135 back to the user and the user can supply the questions to the language processing system to train 150, or the training dataset generation service 130 may store the fully formed training questions 135 in persistent storage for subsequent use in training the language processing system to train.

Figure 2:
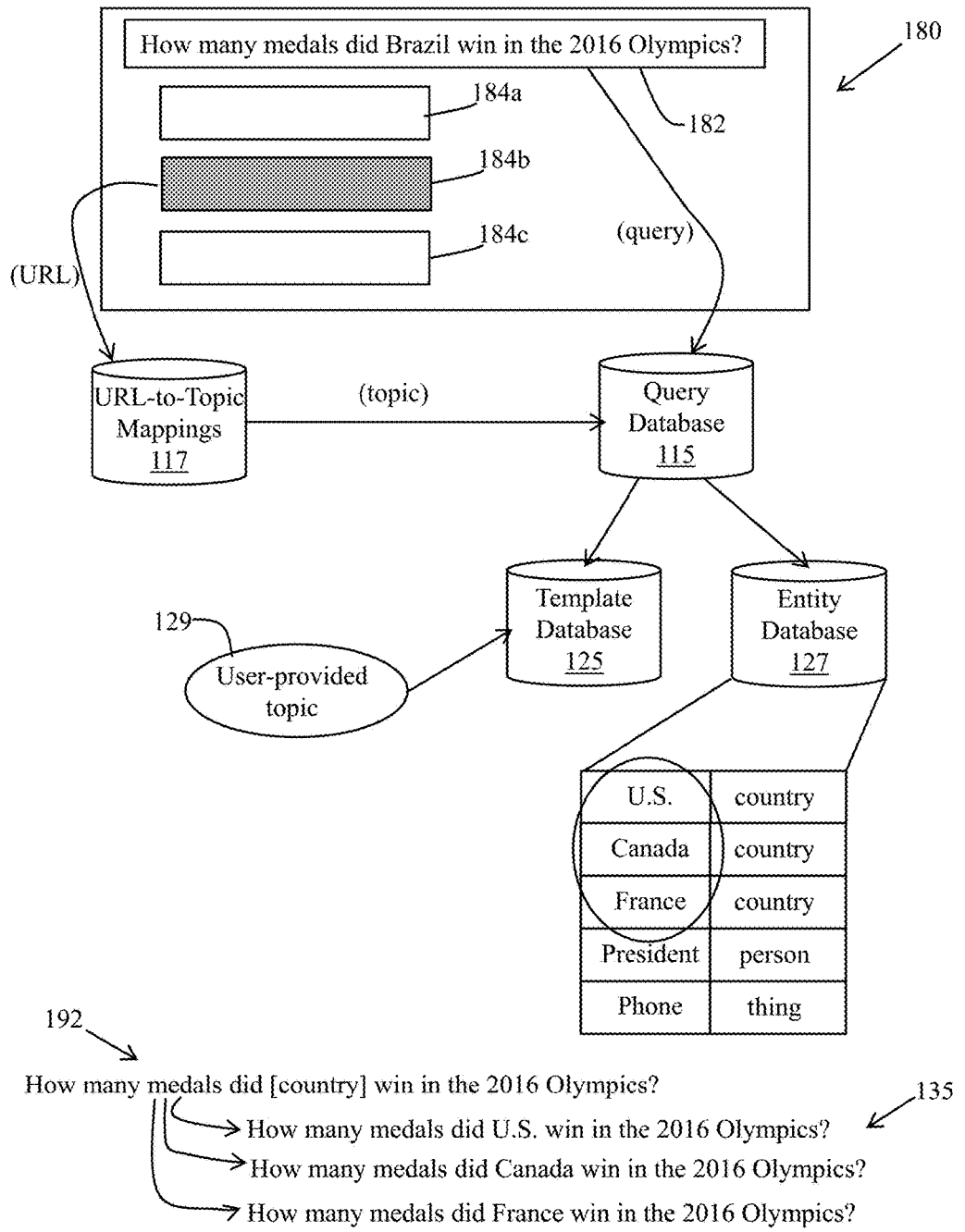
FIG. 2 illustrates an operational flow to generate training questions in accordance with an embodiment.

FIG. 2 illustrates an operational flow to generate fully formed training questions. In a browser window 180, a person has entered a search query 182 in a query field. In the example of FIG. 2, the search query 182 is "How many medals did Brazil win in the 2016 Olympics?" In response to submitting the query, the person is presented with multiple search results 184a, 184b, 184c, etc. The person can select (e.g., click on) any of the search results to receive the web pages associated with the selected result. The selected web page has an associated URL, which can be used as an index value into the URL-to-topic mappings database 117 to retrieve the topic identifier associated with the selected search result. The topic identifier is stored in the query database 115 along with the search query itself as shown. As explained above, question templates and associated time stamps and topic identifiers are stored in the template database 125, and entity names and associated classifications are stored in the entity database 127.

A user may want the system to generate a set of training questions relative to a particular topic of interest. The user-provided topic 129 is used by the training dataset generation service 130 (FIG. 1) to retrieve those question templates from the query database that map to that particular user-provided topic. FIG. 2 illustrates an example of a question template 192 that might have been generated from search query 182. The question template 192 is "How many medals did [country] win in the 2016 Olympics?" where "[country]" is the argument value substituted into the search query as explained above. The entity database 127 is then accessed by the training dataset generation service to retrieve entities whose classifications are "country" in the database. A portion of an example of the entity database is shown containing the entities, U.S., Canada, France, President, and Phone and their corresponding classifications country, country, country, person, and thing. Because U.S., Canada, and France are countries, those entities are used by the training dataset generation service 130 to substitute back into the question template 192 in place of the argument value [country]. Three training questions 135 thus can be generated using the three country-classified entities U.S., Canada, and France as shown in FIG. 2.

Figure 3:
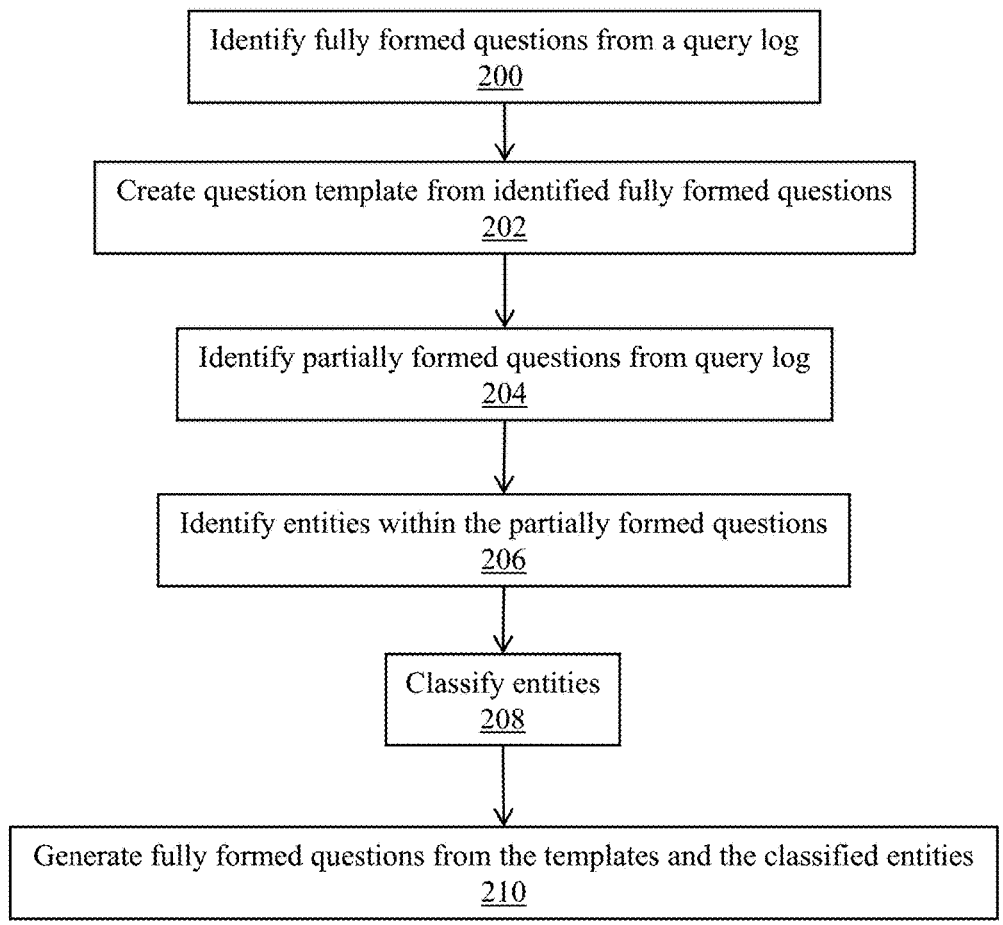
FIG. 3 includes a flow chart of an illustrative method for generating fully formed questions from queries in a query database.

FIG. 3 illustrates a flow chart of a method in accordance with various embodiments. The operations may be performed in the order shown, or in a different order. Further, two or more of the operations may be performed concurrently rather than sequentially. At 200, the method includes identifying fully formed questions from a query log, such as query database 115. Any one or more of various techniques can be employed to identify fully formed questions. Examples of several suitable techniques are provided above.

At 202, the method includes creating question templates from the identified fully formed questions. As explained above, this operation may include identifying the agent of the head of each such query, determining the type of the agent (e.g., person, place, thing, etc.) and replacing the agent with an argument value that encodes the agent's type.

At 204, the method further includes identifying partially formed questions from the query log. In some embodiments, the partially formed questions may include any query that is not otherwise determined to be a fully formed question. From each identified partially formed question, the method includes identifying one or more entities within the question at 206 and classifying each entity at 208, and examples of the implementation of these operations are provided above. Each classified entity (entity and classifier) may be stored in the entity database 127. At 210, the method includes generating fully formed questions from the question templates and the classified entities as explained above.

Figure 4:
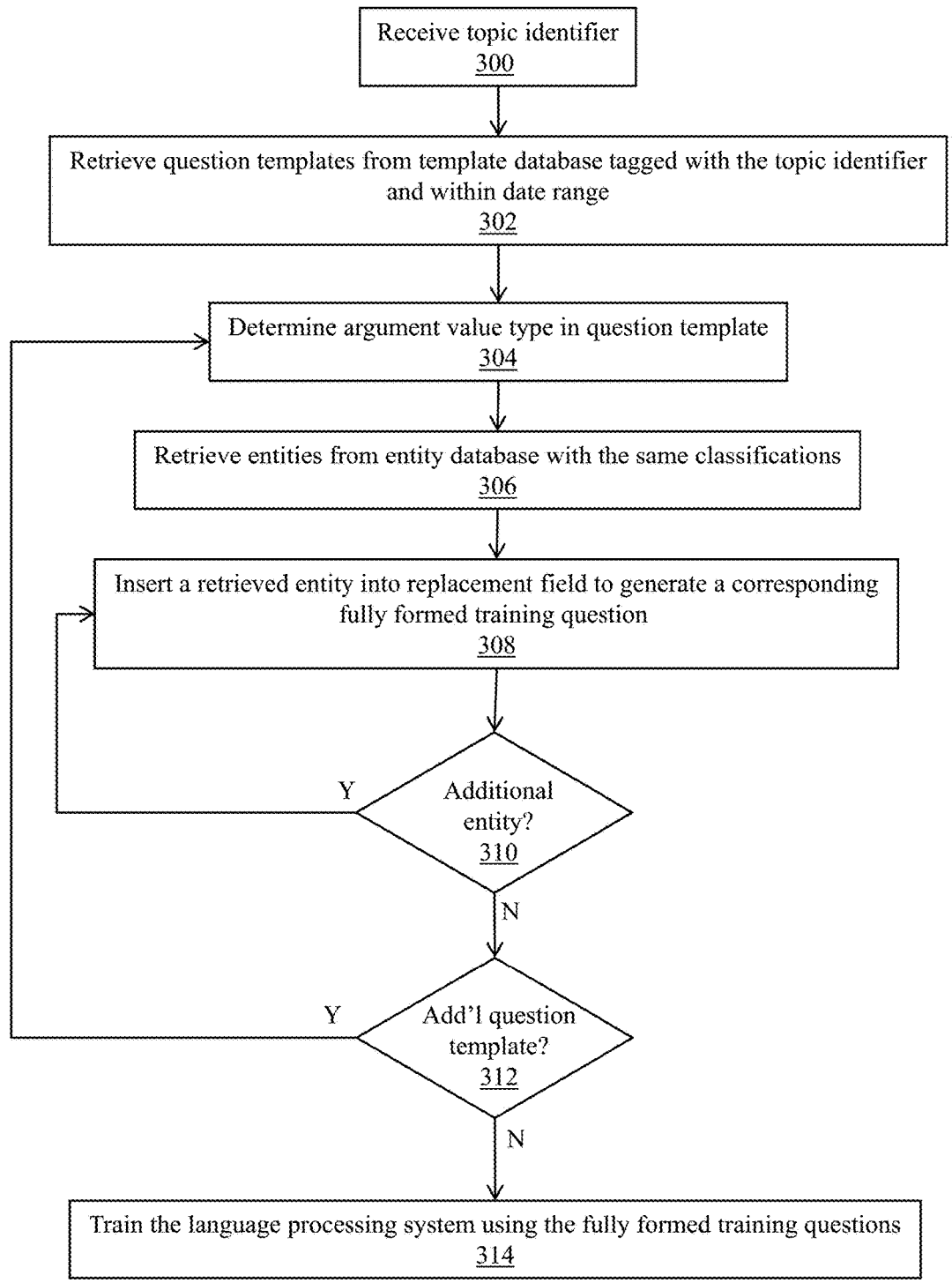
FIG. 4 shows a flow chat of an illustrative method for generating fully formed training questions from question templates in accordance with an embodiment.

FIG. 4 illustrates a method for generating the fully formed questions to train a language processing system. The operations may be performed in the order shown, or in a different order. Further, two or more of the operations may be performed concurrently rather than sequentially. At 300, the method includes receiving a topic identifier. The topic identifier may be received from a user, for example, through a console interface, an API request, etc. The topic identifier corresponds to a topic of interest to the user for the generation of training questions related to that same topic.

At 302, the method may include retrieving question templates from the template database tagged with the topic identifier corresponding to the topic identifier received at 300. The question templates having the specified topic identifier also may filtered based on time. As part of the request for training questions, the user may specify a date range for the search queries used to generate the training questions, or a default date range may be used if not otherwise specified, or no date range may be used. As noted above, each entry in the query database includes the search query character string and a timestamp for the query. The timestamp also may be stored in the entry in the template database of the corresponding question template. If the user has specified a date range and a topic identifier, only those question templates that match the topic identifier and that fall within the specified date range are used to generate the fully formed training questions.

At 304, the method includes determining the type of argument value inserted into the question template. The argument value may be indicative of any of a variety of classifications such as a person, place or thing as noted above. At 306, the method includes retrieving one or more entities from the entity database that have the same classification as the argument value in the question template. In turn, each such entity is then inserted at 308 into the replacement field in place of the argument value to generate a corresponding, fully-formed training question. The process of generating fully formed training questions by inserting an entity into the question template repeats until there are no more suitable entities as determined at decision 310. At decision 312, the method determines whether there are additional question templates relative to the user's specified topic and, if specified, date range. If an additional query template exists in the template database 125 that matches these criteria, then the process loops back to operation 304. If not, the process continues at 314 by training the language processing system using the fully formed training questions (or storing the training questions for subsequent use to train the language processing system 314).

Figure 5:
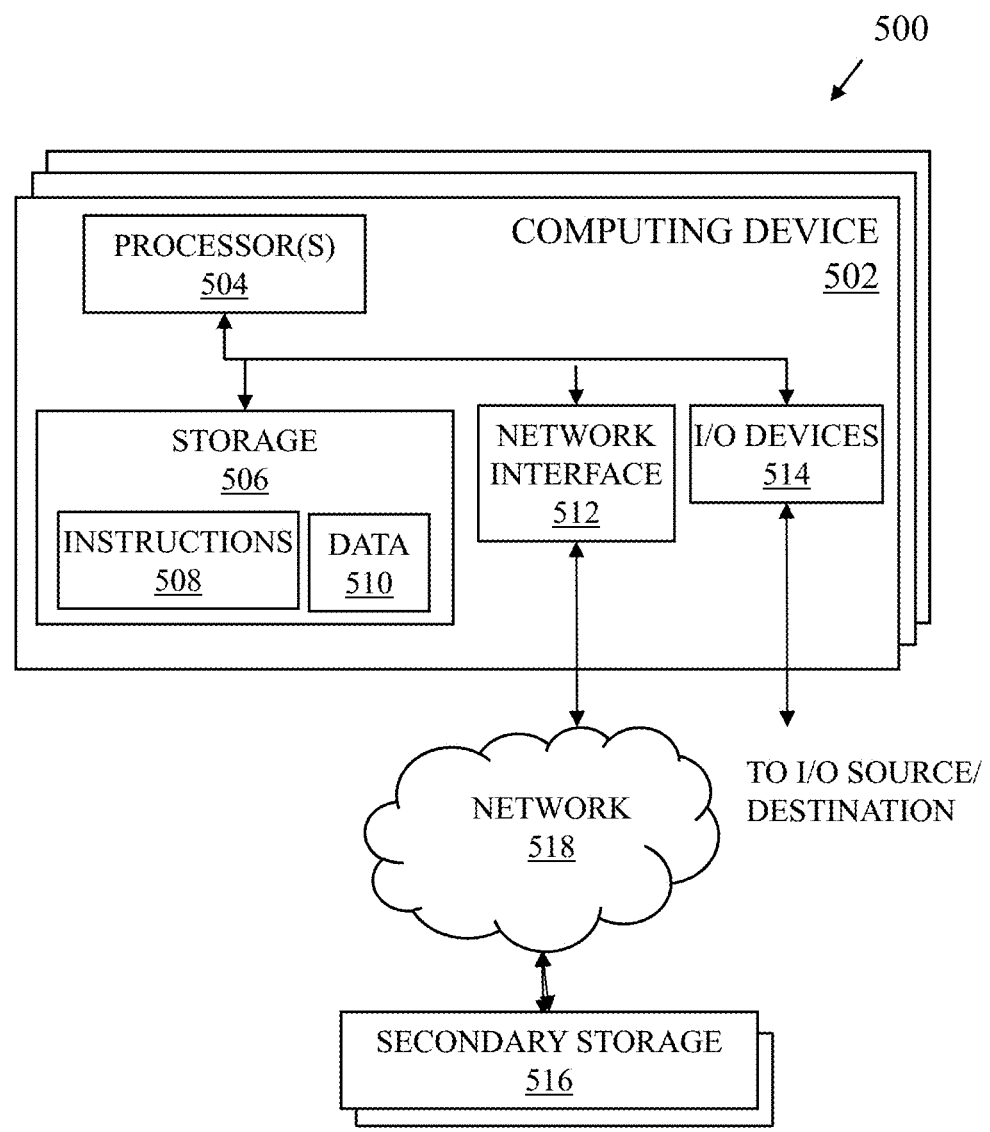
FIG. 5 shows an example of a computing device usable to implement the services of the disclosed embodiments.

FIG. 5 shows a schematic diagram for a computing system 500 suitable for implementation of any of the query service 110, natural language service 120, training dataset generation service 130 and databases, as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various services and databases described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including several processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518. A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the query service 110, natural language service 120, training dataset generation service 130, databases, and other components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    identifying fully formed questions from a query database stored on a storage device, the query database containing a plurality of search query character strings;
    identifying partially formed questions from the query database;
    creating question templates from the identified fully formed questions;
    storing the question templates in a template database;

identifying entities with the partially formed questions and classifying each entity;
storing the classified entities in an entity database; and
generating fully formed questions using the question templates from the template database and classified entities from the entity database.

2. The computer-implemented method of claim 1, wherein identifying the fully formed questions comprises identifying those search query character strings that end with a question mark.

3. The computer-implemented method of claim 1, wherein identifying the fully formed questions comprises:
parsing each search query character string to extract semantic roles to each portion of each such query character string; and
identifying those search query character strings for which an auxiliary verb syntactic role precedes a subject syntactic role.

4. The computer-implemented method of claim 1, wherein identifying the fully formed questions comprises identifying those search query character strings which begin with an interrogative word.

5. The computer-implemented method of claim 1, wherein, for each identified fully formed question, creating a question template includes extracting semantic roles on the fully formed question, identifying entity types of these roles, and modifying the fully formed question to replace the extracted semantic roles with their corresponding entity type labels.

6. The computer-implemented method of claim 1, wherein identifying entities with the partially formed questions and classifying each entity comprises extracting entities and identifying their types from the partial query strings.

7. The computer-implemented method of claim 1, further comprising
receiving an uniform resource locator (URL) of a web page accessed following submission of a particular search query character string;
accessing a URL-to-topic mappings database containing mappings between URLs and associated web page topics to determine a topic associated with the received URL; and
adding a record to the query database including the particular search query character string and the associated topic.

8. The computer-implemented method of claim 7, further comprising including a timestamp in the record.

9. The computer-implemented method of claim 7, wherein storing the question templates in the template database includes, for each question template, retrieving a timestamp from the query database associated with the record from which the question template was created and writing the timestamp to the template database.

10. A system, comprising:
one or more computing devices configured to execute a query service and a natural language service;
one or more storage devices configured to store a query database, a template database and an entity database;
wherein the query service is configured to:
receive a search query character string;
generate a topic identifier associated with the search query character string; and
add a record to the query database including the search query character string, the topic identifier, and a time stamp;
wherein natural language service is configured to:
retrieve a plurality of records from the query database;
for each record, determine whether the search query character string is a fully formed question or a partially formed question;
for a fully formed question, replace a portion of the fully formed question with an argument value indicative of a role associated with the replaced portion of the fully formed question to generate a query template and store the query template in the template database; and
for a partially formed question, identify an entity, classify each identified entity, and store the entity and a classification for the entity in the entity database.

11. The system of claim 10, wherein the one or more computing devices are configured to execute a training dataset generation service, which is configured to generate fully formed questions using query templates from the template database and the entities and their associated classifications from the entity database.

12. The system of claim 10, wherein the one or more storage devices includes a uniform resource locator (URL)-to-topic mappings database containing mappings between URLs and associated web page topics, and wherein the query service is configured to:
receive a URL of a web page accessed from a list of search query results following submission of a particular search query character string;
access the URL-to-topic mappings database to determine a topic associated with the received URL; and
add a record to the query database including the particular search query character string and the associated topic.

13. The system of claim 10, wherein the natural language service is configured to identify fully formed questions from the query database through at least one technique selected from the group consisting of:
identification of those search query character strings that end with a question mark;
identification of those search query character strings for which an auxiliary verb syntactic role precedes a subject syntactic role; and
identification of those search query character strings which begin with an interrogative word.

14. The system of claim 10, wherein, for each determined fully formed question, the natural language service is configured to create a question template through execution of a slot language parser on the fully formed question and modification of the fully formed question to replace at least one portion of the fully formed question with an argument value indicative of a role associated with the replaced portion of the fully formed question.

15. A computer program product for computer generation of training questions for training a language processing system, said computer program product comprising a computer readable storage medium having program instructions embodied therewith, the program instructions executable by a processor to cause the processor to:
from a plurality of search query character strings stored in a storage device, identify fully formed questions and identify partially formed questions;
create question templates from the identified fully formed questions and store the question templates in a template database;
identify entities within the partially formed questions, classify each entity, and store the classified entities in an entity database; and generate fully formed questions through insertion of entities from the entity database into the question templates from the template database.

16. The computer program product of claim 15, wherein the program instructions further cause the processor to identify fully formed questions from a query database through at least one technique selected from the group consisting of:

identification of those search query character strings that end with a question mark;

identification of those search query character strings for which an auxiliary verb syntactic role precedes a subject syntactic role; and identification of those search query character strings which begin with an interrogative word.

17. The computer program product of claim 15, wherein, for each identified fully formed question, the program instructions further cause the processor to create a corresponding question template through execution of a slot language parser on the fully formed question and replacement of at least one portion of the fully formed question with an argument value indicative of a role associated with the replaced portion of the fully formed question.

18. The computer program product of claim 15, wherein the program instructions further cause the processor to receive an uniform resource locator (URL) of web page accessed following submission of a particular search query character string, access a database containing mappings between URLs and associated web page topics to determine a topic associated with the received URL, and add a record to a query database including the particular search query character string and the associated topic and a timestamp.

19. The computer program product of claim 18, wherein the program instructions further cause the processor to create a question template from the record, retrieve the timestamp from the query database associated with the record from which the question template was created, and write the timestamp, the associated topic, and the question template to the template database.

20. The computer program product of claim 19, wherein the program instructions cause the processor to generate the fully formed questions by receiving a request containing a topic identifier, and by accessing the template database to retrieve those question templates associated with the same topic identifier.

* * * * *